Figure 1:
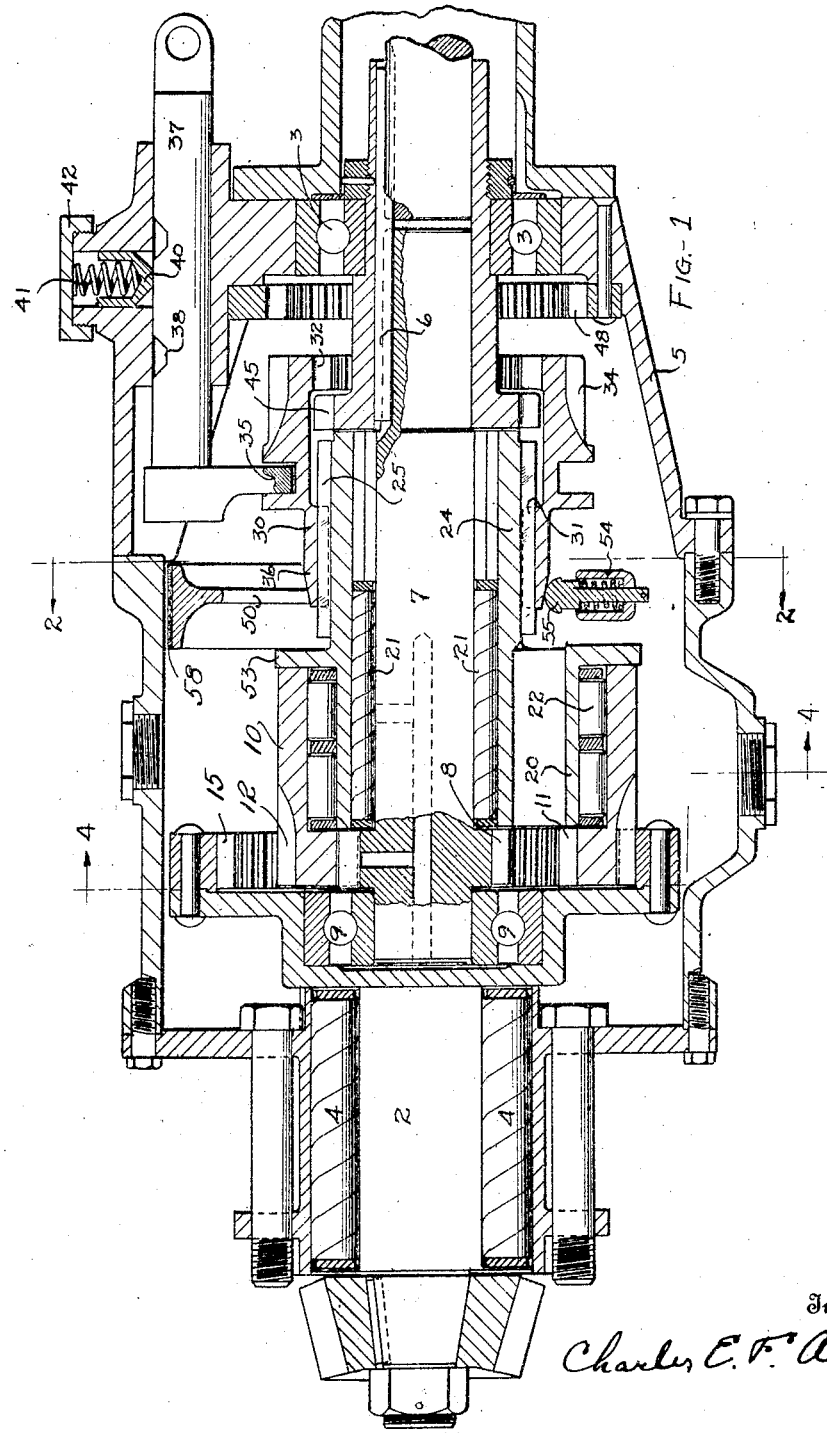

June 28, 1927.

C. E. F. AHLM 1,634,168

TRANSMISSION GEARING

Filed June 30, 1924

3 Sheets-Sheet 2

Inventor
Charles C. F. Ahlm,
By Bates Macklin Goldrich & Teare
Attorneys

June 28, 1927.

C. E. F. AHLM 1,634,168

TRANSMISSION GEARING

Filed June 30, 1924   3 Sheets-Sheet 3

Inventor
Charles E. F. Ahlm,
By Bates, Macklin, Goldrick & Teare,
Attorneys

Patented June 28, 1927.

1,634,168

UNITED STATES PATENT OFFICE.

CHARLES E. F. AHLM, OF CLEVELAND, OHIO.

TRANSMISSION GEARING.

Application filed June 30, 1924. Serial No. 723,153.

This invention relates to a type of gearing adapted to connect a driving and driven shaft and capable of transmitting different speeds from one to the other. The embodiment shown in the present application is particularly adapted for use with automobile transmissions, and the general objects of the invention are the provision of a simple efficient and compact transmission unit for such a purpose.

More specific objects include so arranging the gears of such an apparatus that it may be comparatively noiseless and may be very light in weight with relation to the amount of power it is capable of transmitting.

In carrying out my invention I employ gearing of the class in which there is a circulating and revolving internal external gear as a single unit mounted to rotate upon an eccentric bearing and at times to be propelled by it. The change of speed is accomplished by mechanism for connecting certain of these members or for holding them stationary as desired.

One of the principal objects of the present invention is the provision of a simple gear-like clutch mechanism for the purpose. Another object includes the arrangement of a simple clutching or breaking device to bring two of the relatively rotating members which it is desired to connect by the clutch, to the same speed before making such connection, in order that the connection may be made simply, efficiently and quietly and without danger to the clutch or its teeth.

The particular embodiment shown in the drawing is adapted to be interposed between and existing transmission mechanism of an automobile and the driven members in such a fashion as to increase the number of speed ratios between the motor and drive shaft.

The above objects and advantages will become more apparent in the following description which relates to the drawings showing a preferred embodiment of my invention and the essential characteristics are summarized in the claims.

Figure 2:
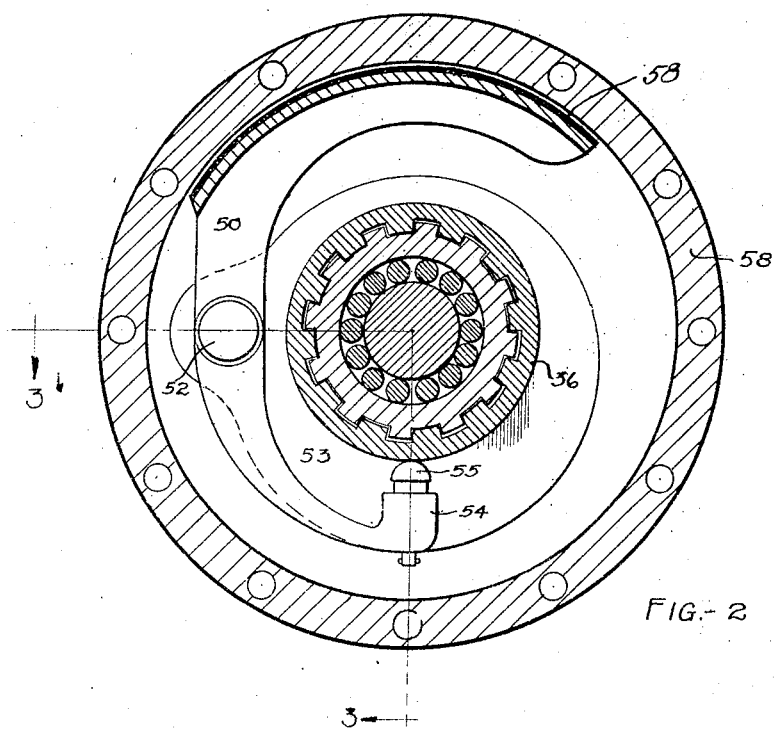
Figure 3:
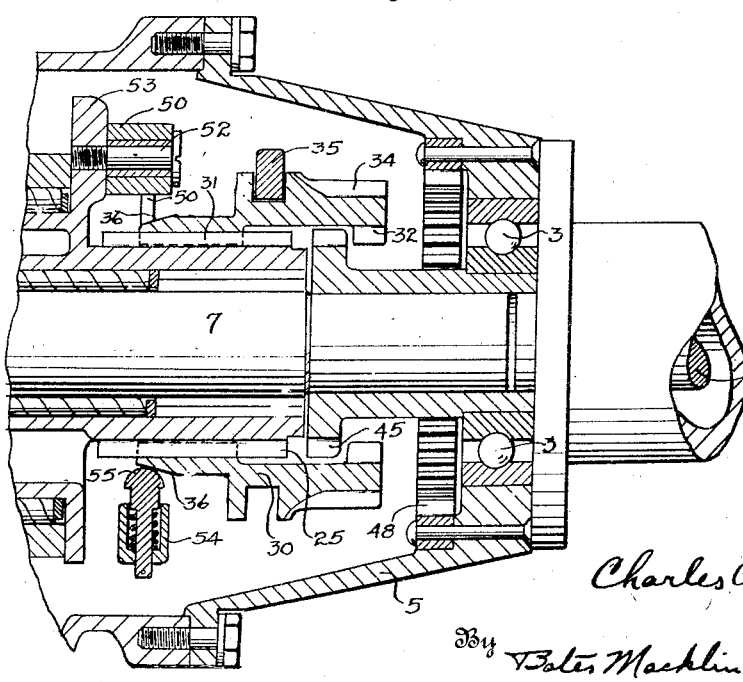
Figure 4:
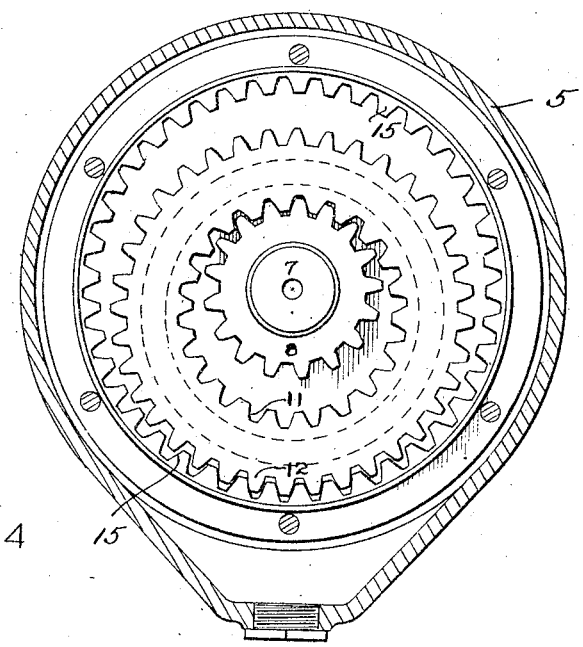
Figure 5:
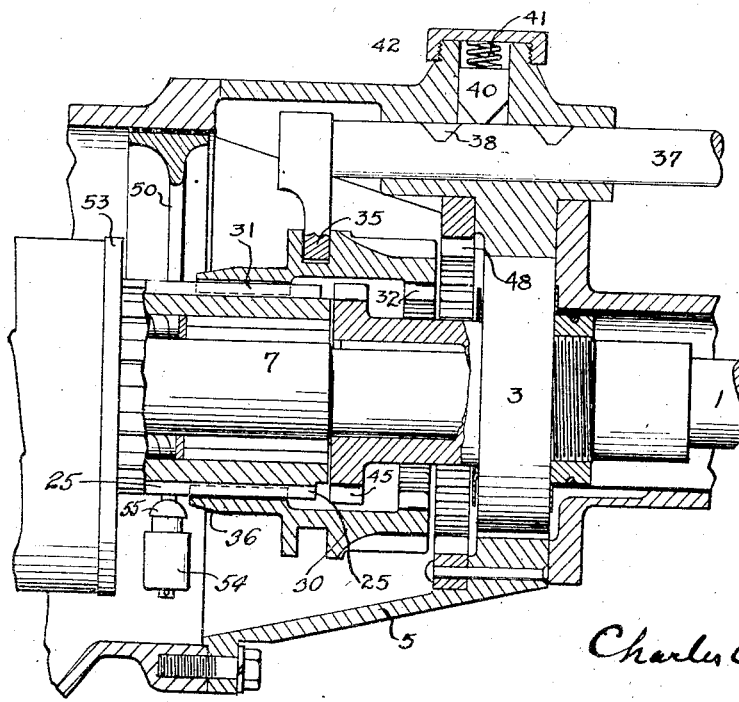

In the drawings, Fig. 1 is a longitudinal section through my transmission mechanism; Fig. 2 is the transverse section taken substantially on a plane indicated by the line 2—2 of Fig. 1; Fig. 3 is a fragmentary longitudinal cross section taken on the intersecting planes indicated by the line 3—3 on Fig. 2; Fig. 4 is a similar transverse section on a plane indicated by the line 4—4 of Fig. 1; Fig. 5 is a fragmentary longitudinal cross section through the clutching members.

Briefly the arrangement shown consists of a casing having suitable bearings therein for the driving and driven shaft and the gearing includes an eccentrically mounted circulating internal external composite gear, meshing internally with a spur gear on the driving member and externally with another internal gear connected with the driven member. It also includes the means, in the nature of a connection for bringing the driving action to the eccentric bearing for a reduced speed and another means for connecting the parts together for direct drive, that is, for the two shafts to be driven at the same speed. The bringing together of the rotation of the driving and driven members to the same speed by locking these elements is preferably accomplished by moving the clutch members to the position clutching the eccentric bearings and the driving member together while at the same time a splined connection is always maintained between the driving member and its extension.

Describing these parts more in detail and with the use of reference characters, the driving shaft is designated 1, and the driven member or shaft 2 having bearings 3 and 4 respectively in a suitable casing indicated at 5, the casing being made up of a number of castings for convenience in assembling the mechanism. An extension 7 is splined to the driving member and has a pinion 8, which in turn meshes with the composite internal external gear 10, its internal teeth being designated 11 and the external teeth being shown at 12. The teeth 11 mesh with those of the pinion 8 while the teeth 12 mesh with an internal gear 15, shown as carried on an outwardly extending flange rigid with the driven member 2. This flange is cupped to embrace a suitable bearing at 9, which embraces and supports the extension 7 as shown.

The composite internal external gear 10 is carried on an eccentric bearing 20 mounted to revolve about the shaft extension 7, preferably upon roller bearings 21, while between the eccentric 20 and the gear member 10 are shown suitable roller bearings 22. This eccentric bearing is shown as having a sleeve extension 24 provided with flutes or teeth 25. These flutes are slidably engaged by complementary flutes 31 of an embracing clutch member 30. This clutch member is preferably provided with an intermediate groove embraced by a clutch shifter shown at 35, having a shank extending through a bearing in the casing. This shank is designated 37 and is shown as having notches 38 adapted to be engaged by a latching plunger 40 pressed downwardly by a spring 41, secured by a suitable cap 42, threaded upon a boss on the casing.

The clutch member 30 also has teeth designated 32 adapted to mesh or slide into corresponding external teeth or flutes designated 45 preferably rigid with the driven member 1.

In one position of the shifter, it will be seen that the clutch member will be thrust toward the left in Fig. 1, thus bringing the teeth 32 and 45 together, while the engagement of the teeth 31 with those of the flutes 25 of course maintained. This connects the driving member with the sleeve of the eccentric bearing. Thus the pinion 8 and eccentric bearing 9 may be driven in unison with the driving member preventing relative rotation between the eccentric, the drive shaft and the composite gear 10 on the eccentric bearing, with the result that the driven member is rotated at the same speed, there being no relative rotation between the gear 15 and the gear 10. This I term the "high" or "direct" drive.

For another speed position the clutch is shifted to bring teeth 34 into engagement with a stationary clutch member rigid with the casing and designated 48. In this position (where the clutch is held by the plunger 40 pressing into the notch 38) the teeth 31 and 25 maintain engagement as before, and the casing or frame 5 being relatively stationary, the eccentric bearing is held against rotation, while the drive is transmitted directly through the shaft 1, extension 7 and pinion 8, causing the internal external gear to rotate about the stationary eccentric bearing, and in turn causing its external teeth to drive the driven member 20.

The shift of the clutch from "high" position to low requires that the speed of the clutch member 48, which, in the form shown in the drawings is zero, and the clutch member 30, be brought to substantially the same speed, that is, here the clutch member 30 is also stopped. To accomplish this I have provided a clutch member, preferably an automatically acting centrifugal clutch controlled also by the shifting of the clutch member 30. In the drawings this clutch for bringing the speed of the clutch member 30 and casing or clutch member 48 together, consists of a pivoted arm 50 mounted upon a flanged portion 53 rigid with the eccentric bearing member 20. At one side of the pivot, the arm carries an inwardly projecting head, preferably rounded as shown, and having engagement normally with a cylindrical surface 36 of the clutch member 30, which holds the shoe portion 58 out of engagement with the cylindrical surface of the casing, against which it will normally bear. When the clutch is withdrawn the head 55 is slipped off from the beveled end 36 of the clutch member 30, as shown in Fig. 5. This will occur when the clutch 30 is withdrawn to cause engagement of the teeth 34 and 48. The result is that the braking action or clutching action quickly brings the brake shoe and flange 53 of the eccentric bearing to arrested position with the member 48. Thus the shifting between the clutch 30 and 48 is easily and safely accomplished. When the clutch 30 is thrust to its other position, the beveled ends 36 sliding under the head 55 will raise the head 55 freeing the brake from the casing as appears in Figs. 1 and 3.

When the clutch teeth 34 and 48 are in engagement holding the eccentric bearing against rotation for reduced drive as above explained, and it is desired to shift into direct drive, the main clutch of the car is, of course, thrown out of engagement. At this time the only driving impulse transmitted to the shaft 1 is due to the momentum of the car. When the teeth 34 are thrown out of engagement, and previous to connecting the teeth 32 and 45, there is a tendency for the eccentric bearing to be rotated idly. Such rotation is now retarded by the engagement of the brake surface 58 acting on the interior of the casing, until the conical surface 36 pulls the brake out of active position just as the teeth 32 and 45 engage. Thus the brake is capable of acting centrifugally to decrease relative rotation between the clutch members to be engaged, previous to such engagement, in each of the clutching actions.

The position of the brake arm 50 and the weight of it are such that the eccentricity of the bearing 20 and composite gear 10 is counterbalanced to accomplish running balanced condition.

In the utilization of such gearing, it will be seen that I have accomplished a very effective and powerful transmission and that the parts because of the relationship of internal and external gears are very compact, and practice has demonstrated that they are extremely silent and durable, which features are highly desirable, particularly in automobile transmission.

Having thus described my invention, I claim:

1. A driving and driven member, a pinion on the driving member, a composite internal external gear, an internal gear meshing with the external portion thereof, and having a driving connection with the driven member, an eccentric bearing for the internal external gear, a clutch for connecting the eccentric bearing with the driving member to cause it to rotate, a clutch member coacting with the first clutch member for preventing rotation of the eccentric bearing, and means for bringing the eccentric bearing to a stop before bringing the last mentioned clutch members together.

2. In a transmission gearing, the combination with a driving and driven member, of a pinion on the driving member, an internal external gear member driven by the pinion, a bearing for the internal external gear eccentric to the driving member and capable of rotation, an internal gear on the driven member meshing with the external teeth of the internal-external gear, a clutch member connected to rotate with the eccentric bearing and another clutch member coacting with the first clutch member for holding it against rotation relative to the casing, means for causing engagement of the first clutch member with the latter, and means for preventing relative rotation between the last named members before the clutching engagement takes place.

3. In a transmission gearing the combination of a driving and a driven shaft, a pinion carried by one of the shafts, an internal gear meshing therewith, an external gear rigid with the internal gear, a rotatable bearing eccentrically mounted relative to the pinion carrying shaft and carrying said gears, an internal gear rigid with the other shaft and meshing with said external gear, clutch members for connecting said pinion carrying shaft with the bearing to rotate the bearing, one of said clutch members being movable, another clutch member cooperating with the movable clutch member for holding the bearing against rotation, and a brake controlled by the movement of the movable clutch member, arranged to act to restrain the rotation of the bearing previous to the engagement of the movable clutch member and the said other clutch member.

4. In a transmission gearing in combination with a pair of rotatable members, of a pinion on one of the members, an eccentric bearing, a composite internal-external gear mounted thereon having teeth in mesh with the pinion, an internal gear rigid with the other rotatable member and meshing with the internal-external gear, clutch means for causing one of the rotatable members to rotate the eccentric bearing, a dental clutch couple for causing relative rotation between the eccentric bearing and said last mentioned rotatable member, and friction means for decreasing the relative rotation between the members of the couple previous to causing the complete dental engagement thereof.

5. A transmission gearing comprising in combination a drive shaft and driven shaft, a pinion on the drive shaft, an internal gear meshing therewith, a second gear rigid with the internal gear, a rotatable eccentric bearing for the composite gear, means whereby said second gear may drive the driven shaft, and a clutch for connecting and disconnecting the drive shaft and eccentric bearing, and means controlled thereby to decrease the relative rotation of the members to be connected, previous to effecting such connection.

6. In a transmission gearing, the combination of a drive shaft and driven shaft, bearings therefor, a stationary casing supporting the bearings, a pinion rigid with the drive shaft, a composite internal external gear having its internal gear meshing with said pinion and an internal gear connected with the driven shaft and meshing with the external gear, a clutch member drivingly connected to the eccentric bearing, and a coacting clutch member rigid with the casing, means for shifting said clutch members into such coaction, and a brake member coacting with the casing for bringing the eccentric bearing to a stop when such clutch member is shifted, and before its engagement with the clutch member on the casing.

7. In a transmission gearing, the combination of a drive shaft and driven shaft bearings therefor, a stationary casing supporting the bearings, a pinion rigid with the drive shaft a gear rigid with the driven shaft, a composite gear having internal gear teeth meshing with said pinion and another set of gear teeth in mesh with the first named gear, a rotatable eccentric bearing therefor, a clutch member drivingly connected to the eccentric bearing, a coacting clutch member held against rotation relative to the casing, and means for shifting said clutch members into such coaction, a brake member for bringing the eccentric bearing substantially to a stop when such clutch member is shifted, and before its engagement with the clutch member of the casing, said brake member being positioned and weighted to counterbalance the eccentricity of the eccentric bearing and gear thereof.

8. In a transmission gearing in combination a driving and driven member, a pinion on one of the members, gear on the other, a composite gear having mutually rigid sets of gear teeth connecting the pinion with the internal gear, an eccentric bearing rotatably mounted on the axis of one of said members for supporting the composite gear, clutch means for causing one of the members to rotate the eccentric bearing including a movable clutch member, other clutch means cooperating with the movable clutch member for causing relative rotation between the eccentric bearing and the said last named member, and means for restraining the relative rotation between said other clutch means and the movable clutch member previous to causing their complete engagement, said means including a counterweighted friction member secured to the eccentric bearing and arranged to counterbalance the eccentricity thereof.

9. A transmission gearing comprising in combination a drive shaft and driven shaft a casing therefor, a pinion on the drive shaft, an internal gear meshing therewith, a second gear rigid with the internal gear, a rotatable eccentric bearing for the composite gear, means whereby said second gear may drive the driven shaft, a movable clutch for connecting and disconnecting the drive shaft and eccentric bearing and for connecting the bearing to the casing, and means controlled thereby to decrease the relative rotation between the bearing and one of the members with which it is to be connected previous to effecting such connection.

In testimony whereof, I hereunto affix my signature.

CHARLES E. F. AHLM.